(12) United States Patent
Polachek

(10) Patent No.: US 8,713,847 B2
(45) Date of Patent: May 6, 2014

(54) FISHING LURE

(76) Inventor: Michael L. Polachek, Valley View, OH (US)

(*) Notice: Subject to any disclaimer, the term of this patent is extended or adjusted under 35 U.S.C. 154(b) by 2271 days.

(21) Appl. No.: 11/487,188

(22) Filed: Jul. 14, 2006

(65) Prior Publication Data

US 2008/0010893 A1    Jan. 17, 2008

(51) Int. Cl.
*A01K 45/00*    (2006.01)

(52) U.S. Cl.
USPC .......................................... 43/42.47

(58) Field of Classification Search
USPC ............ 43/42.47, 42.24, 42.28, 42.37, 42.38, 43/42.45; D22/129
See application file for complete search history.

(56) References Cited

U.S. PATENT DOCUMENTS

| | | | | |
|---|---|---|---|---|
| 2,119,805 A | * | 6/1938 | Davenport | 43/42.52 |
| D152,243 S | * | 1/1949 | De Bay, Jr | D22/128 |
| 3,006,103 A | * | 10/1961 | Scott | 43/42.06 |
| 3,248,820 A | * | 5/1966 | Lamar | 43/42.29 |
| 3,271,892 A | * | 9/1966 | Sabrsula | 43/42.03 |
| D240,528 S | | 7/1976 | Harris | |
| 4,367,607 A | * | 1/1983 | Hedman | 43/42.1 |
| 4,662,100 A | | 5/1987 | Yarusso | |
| 4,773,180 A | * | 9/1988 | Shimizu | 43/42.11 |
| D301,730 S | | 6/1989 | Morris | |
| 5,077,931 A | * | 1/1992 | Marshall | 43/42.52 |
| 5,953,848 A | * | 9/1999 | Darnell et al. | 43/42.19 |
| 5,992,085 A | * | 11/1999 | Schultz et al. | 43/44.2 |
| D428,104 S | | 7/2000 | Woods | |
| D460,801 S | | 7/2002 | Jones | |
| 6,618,979 B2 | * | 9/2003 | Wacha | 43/42.47 |
| 6,702,339 B1 | | 3/2004 | Geozalian | |
| 7,140,146 B2 | * | 11/2006 | Gill | 43/42.39 |
| 2005/0246940 A1 | * | 11/2005 | Jones et al. | 43/42.5 |

* cited by examiner

*Primary Examiner* — K. Berona
(74) *Attorney, Agent, or Firm* — Forrest L. Collins Law Offices, LLC; Forrest L. Collins

(57) ABSTRACT

The present invention deals with unique fishing lure that functions by means of an artificial lure fluttering in the water to simulate natural bait movement. The elements of the complete system interact to maximize the flutter effect through use of the particular fishing lure hook assembly, the fishing lure, the fishing line, and the knot system employed on the fishing line.

7 Claims, 4 Drawing Sheets

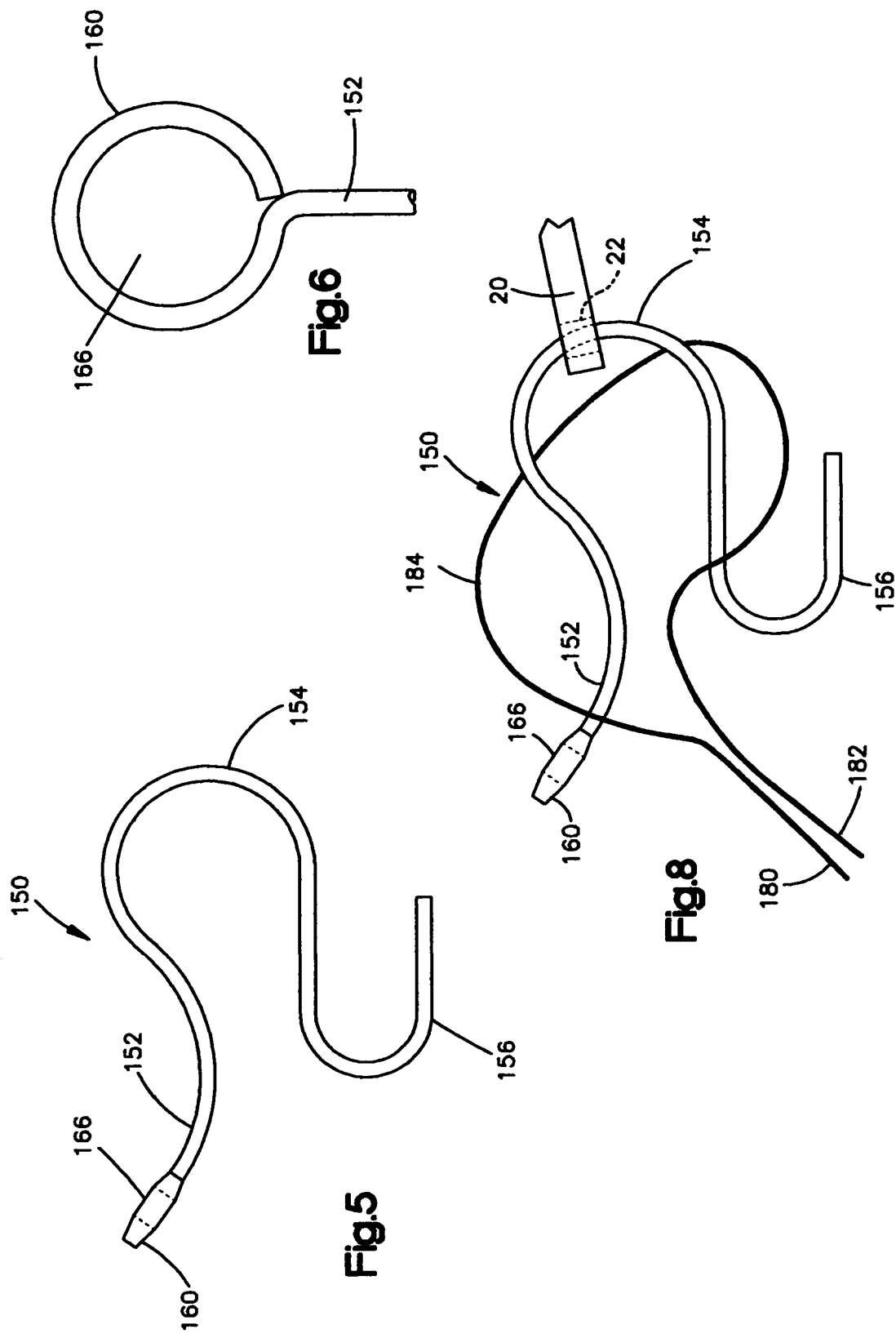

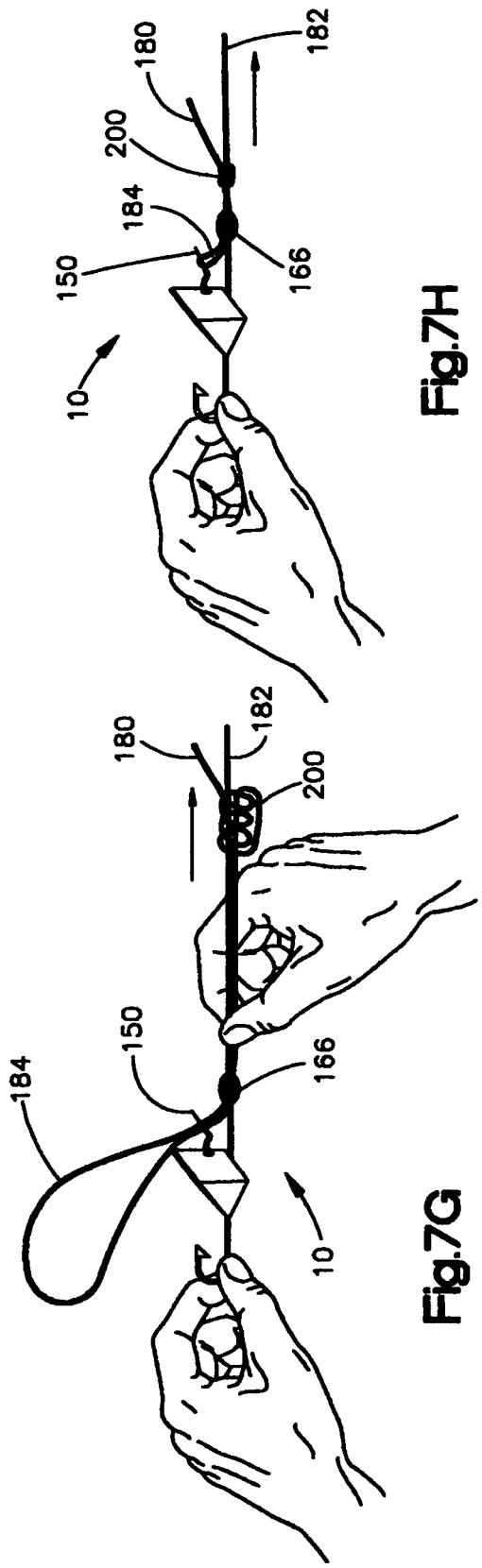
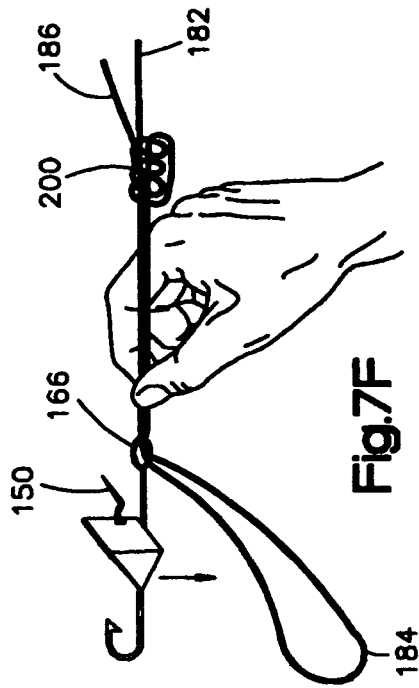
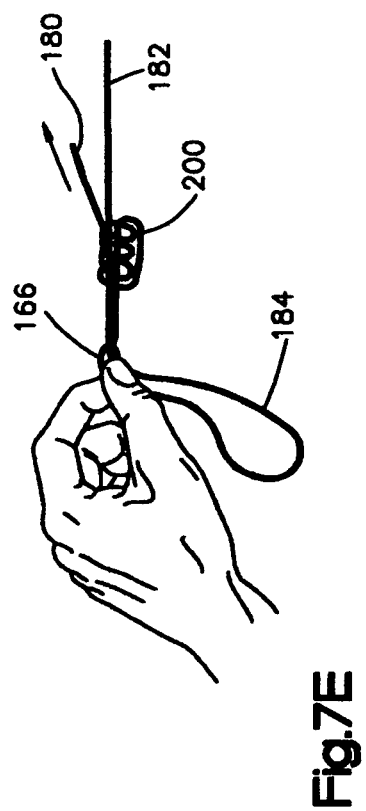
Fig.7E  Fig.7F  Fig.7G  Fig.7H

FISHING LURE

BACKGROUND OF THE INVENTION

1. Field of the Invention

The purpose of this invention is to obtain a fishing lure

2. Description of the Art Practices

Yarusso in U.S. Pat. No. 4,662,100 issued May 5, 1987 describes a fishing lure has a body with a diamond-shaped cross section with a first front apex and a second rear apex disposed along an axis and third and fourth apexes disposed along opposite sides of the axis. The body has a bow portion with first and second surfaces extending from the first apex rearwardly to the third and fourth apexes, respectively, the first and second surfaces forming an edge extending from the first apex to a keel portion. A hook extends rearwardly from the second apex and an eyelet is disposed on the edge of the bow portion and rearwardly from the first apex and forward of the keel portion.

Geozalian in U.S. Pat. No. 6,702,339 issued Mar. 9, 2004 A fishing hook knot tightening device for tying and tightening a knot between a fishing hook and a fishing line. The device has a T-shaped handle, an eyelet attached to the handle, and a blade incorporated into the handle for cutting the fishing line. In use, the fishing line leader end is threaded through the fishing hook eye, and the fishing line is tied into a knot and pulled tight. The barbed portion of the fishing hook is then hooked through the eyelet at the end of the handle vertical piece. The knot is tightened by gripping the T-shaped handle with one hand, holding the fishing line with the other hand, and then pulling the hands in opposite directions. Once the knot is sufficiently tightened, the blade may be used to cut the fishing line as necessary.

Harris in U.S. Pat. D240,528 issued Jul. 13, 1976 describes a synthetic worm being attached to a fishing lure. Woods in U.S. Pat. D428,104 issued Jul. 11, 2000 describes an insect like fishing lure.

Morris in U.S. Pat. D301,730 issued Jun. 20, 1989 describes a weighted fishing worm with a hook attached. Jones in U.S. Pat. D460,801 issued Jul. 23, 2002 describes an apparently segment fishing lure worm.

To the extent that the foregoing references are relevant to the present invention, they are herein specifically incorporated by reference. To the extent that the foregoing patents and citations are relevant to the present invention they are herein incorporated by reference.

The portion of the disclosure of this patent document contains material that is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

SUMMARY OF THE INVENTION

The present invention describes a fishing lure hook assembly comprising:

a fishing lure hook assembly base;

a fishing lure hook assembly base upper triangular region connected to said fishing lure hook assembly base;

a fishing lure hook assembly base triangular region interior channel located in fishing lure hook assembly base upper triangular region;

a fishing lure hook assembly base fish hook;

said fishing lure hook assembly base fish hook having a fishing lure hook assembly base fish hook straight region;

said fishing lure hook assembly base fish hook straight region extending into said fishing lure hook assembly base triangular region interior channel and affixing said fishing lure hook assembly base triangular region interior channel.

The present invention also describes a fishing lure comprising:

a generally trapezoidally shaped flexible fishing lure body;

said generally trapezoidally shaped flexible fishing lure body having a three dimensional shape with a length, width, and cross-sectional area;

said generally trapezoidally shaped flexible fishing lure body having a first set of two sides;

one side fishing lure body lower side of said first set of two sides having a greater width than second side of said first set of two sides along said length of said generally trapezoidally shaped flexible fishing lure body;

said generally trapezoidally shaped flexible fishing lure body having a second set of two sides of generally equal width along said length of said generally trapezoidally shaped flexible fishing lure body;

said first set of two sides each having a greater surface area than each of the second set of two sides.

The present invention further describes a method of affixing a fishing lure hook assembly to a fishing line comprising:

attaching a fishing lure line attachment fishing lure line attachment mechanism having a fishing lure line attachment eyelet opening to a fishing lure hook assembly and affixing a fishing line including the steps of:

passing said fishing line through said fishing lure line attachment eyelet opening in one direction;

passing said fishing line through said fishing lure line attachment eyelet opening in the opposite direction thereby obtaining a fishing line first loop and a fishing line terminal end;

thereafter forming a fishing line second loop by returning a segment of said fishing line terminal end toward said fishing lure line attachment eyelet opening and passing said fishing line terminal end over said fishing line;

thereafter passing said fishing line terminal end helically around fishing line 180 to obtain at least one fishing line third loop; and, then drawing fishing line taut to obtain fishing line knot thereby affixing said fishing lure hook assembly to said fishing line.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 5 is a side view of a fishing lure line attachment mechanism;

FIG. 6 is a end view of the fishing lure line attachment mechanism according to FIG. 5;

FIG. 7A through FIG. 7H are a sequential illustration of knots used to affix the fishing lure hook assembly to a fishing line; and, FIG. 8 shows the partial assembly of FIG. 5 with the elements of FIG. 2 and FIG. 7.

With more particular reference to the drawings the following is set forth.

DETAILED DESCRIPTION OF THE INVENTION

The present invention deals with a fishing lures. It is desirable when fishing particularly with an artificial bait that the artificial bait assume the characteristics of the naturally occurring prey. One characteristic of a naturally occurring prey that is difficult to obtain is called the flutter.

In the naturally occurring prey flutter occurs because of the natural motion of the prey. However, when an artificial lure is employed several factors to be considered in determining how to obtain the fluttering motion.

Of course, the most important factor to be considered is what is the natural motion the prey. After the natural motion of the prey is determined one may set about to consider the factors necessary in obtaining a simulated natural motion prey in manufacturing an the artificial fishing lure.

To determine what must be done with artificial fishing lure one must consider what factors go into causing the motion of the artificial bait in the fishing lure. The factors to be determined in causing the correct motion of the artificial bait include a human factor as to how the person fishing will handle the various items of fishing tackle.

A first aspect of creating a realistic flutter motion in an artificial bait include the fishing line, the type of knot utilized to affix the line, the head and body of the mechanism, and the lure itself. Starting with the lure, it may not be necessary to have the lure appear identical to the actual prey. The foregoing is important as the fluttering motion of the prey is actually more important than the outward appearance of the prey.

It has been determined in the present invention that the body of the artificial lure will play an important part in imparting the desired flutter motion to the artificial lure. It has also been determined important that the manner of attachment of the artificial lure to the fishing line is also important.

Figure 1:
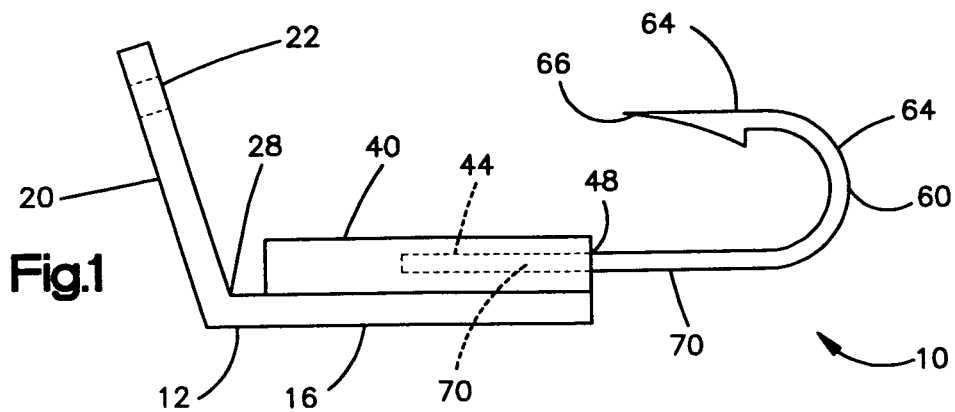
FIG. 1 is a side view of a fishing lure hook assembly according to an aspect of the present invention.

As seen in FIG. 1, the present invention a fishing lure hook assembly 10 is composed of a fishing lure hook assembly base 12. The fishing lure hook assembly base 12 may be formed of a single material. The material utilized for the fishing lure hook assembly base 12 is typically a metal such as stainless steel.

For convenience, the fishing lure hook assembly base 12 has two distinct regions. The first region of the fishing lure hook assembly base 12 is the fishing lure hook assembly base triangular region 16. The second region of the fishing lure hook assembly base 12 is the fishing lure hook assembly base rectangular region 20.

A fishing lure hook assembly base rectangular region channel 22 is centrally located in end of the fishing lure hook assembly base rectangular region 20 at the end opposite the fishing lure hook assembly base triangular region 16.

The fishing lure hook assembly base 12 is conveniently a unitary piece comprising the fishing lure hook assembly base triangular region 16 and fishing lure hook assembly base rectangular region 20 divided at an position denominated as fishing lure hook assembly base transition region 28.

The fishing lure hook assembly base transition region 28 conveniently forms an angle from 41 degrees to 47 degrees, preferably 43 degrees to 45 degrees. The overall shape of the fishing lure hook assembly base 12 is determined by the fishing lure hook assembly base rectangular region 20 being rectangular and the fishing lure hook assembly base triangular region 16 being triangular which when combined overall makes the fishing lure hook assembly base 12 pentagonal.

The fishing lure hook assembly base 12 is further comprised of a fishing lure hook assembly base upper triangular region 40. The fishing lure hook assembly base upper triangular region 40 generally corresponds to the cross-sectional area of the fishing lure hook assembly base triangular region 16. The fishing lure hook assembly base triangular region 16 and the fishing lure hook assembly base upper triangular region 40 are fixed together such as by an adhesive (epoxy), welded together or otherwise fixed in place one over the other. The fishing lure hook assembly base upper triangular region 40 is typically made of bismuth rather than lead in which is being phased out for environmental reasons.

The fishing lure hook assembly base upper triangular region 40 has a fishing lure hook assembly base triangular region interior channel 44 located in the fishing lure hook assembly base upper triangular region 40. The fishing lure hook assembly base triangular region interior channel 44 is at least partially defined by the fishing lure hook assembly base triangular region interior channel opening 48.

The fishing lure hook assembly base triangular region interior channel opening 48 is located on one leg of the fishing lure hook assembly base upper triangular region 40. The fishing lure hook assembly base triangular region interior channel opening 48 is generally located at the midpoint of the leg the fishing lure hook assembly base upper triangular region 40 and extends into the middle of the fishing lure hook assembly base upper triangular region 40, (e.g. centrally located).

A fishing lure hook assembly base fish hook 60 is a conventional fishhook with the eyelet removed. While the eyelet may be retained on the fishing lure hook assembly base fish hook 60 it is not necessary and complicates the design of the fishing lure hook assembly base triangular region interior channel 44.

The fishing lure hook assembly base fish hook 60 further comprises a fishing lure hook assembly base fish hook curved region 64, a fishing lure hook assembly base fish hook curved region 64, a fishing lure hook assembly base fish hook barb 66 and a fishing lure hook assembly base fish hook straight region 70.

The assembly of the fishing lure hook assembly base fish hook 60 into the fishing lure hook assembly base upper triangular region 40 may be by utilizing molten bismuth to form the fishing lure hook assembly base upper triangular region 40. The fishing lure hook assembly base fish hook 60 may be inserted into the fishing lure hook assembly base upper triangular region 40 is still malleable thereby forming the fishing lure hook assembly base triangular region interior channel 44.

Alternatively, the fishing lure hook assembly base triangular region interior channel 44 may be drilled in the fishing lure hook assembly base upper triangular region 40 and the fishing lure hook assembly base fish hook straight region 70 fixed in place in the fishing lure hook assembly base triangular region interior channel 44. The manner of fixing the fishing lure hook assembly base fish hook straight region 70 in place may made the by utilizing an adhesive such as a curable epoxy resin.

Figures 2, 3:
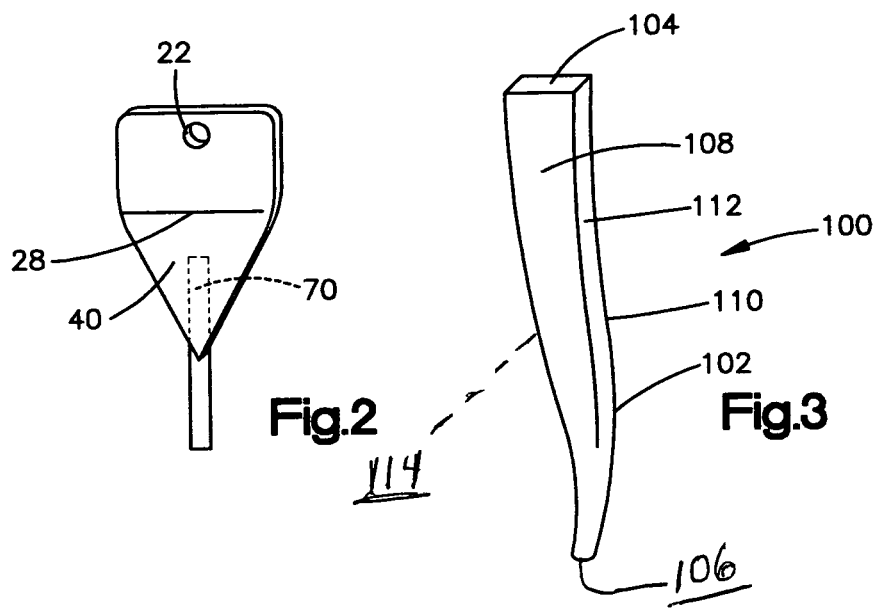
FIG. 2 is a partial perspective according to FIG. 1.
FIG. 3 is a perspective of a fishing lure according to an aspect of the present invention.

As best seen in FIG. 3, is a fishing lure 100. The fishing lure 100 is comprised of a polyvinylchloride resin and a plastisol. The fishing lure 100 is sufficiently flexible that it may be wrapped around, for example, a conventional pencil several times. The fishing lure 100 has a generally quadrilateral pyramidal shape (generally trapezoidal) when viewed from the perspective. The fishing lure 100 has a fishing lure body first end 104. The fishing lure 100 has a fishing lure body second end 106.

The fishing lure 100 has a fishing lure body lower side 108. The fishing lure body lower side 108 preferably has a smooth shiny appearance (e.g. somewhat reflective of light). The shiny appearance of the fishing lure body lower side 108 simulates the natural bait when viewed by a fish.

The fishing lure 100 has a fishing lure body upper side 110. The fishing lure body upper side 110 has a roughed appearance that is less reflective of light than the fishing lure body lower side 108. The roughed appearance of the fishing lure body upper side 110 simulates the natural bait when viewed by a fish. The fishing lure 100 overall preferably does not have a segmented appearance.

The fishing lure body lower side 108 has a greater width than the fishing lure body upper side 110 along said length of the generally trapezoidally shaped flexible fishing lure body 102. The fishing lure 100 has a fishing lure first side region 112. The fishing lure 100 has a fishing lure second side region 114. The fishing lure first side region 112 and the fishing lure second side region 114 are generally symmetrical and thus the second set of two sides have equal surface area.

Figure 4:
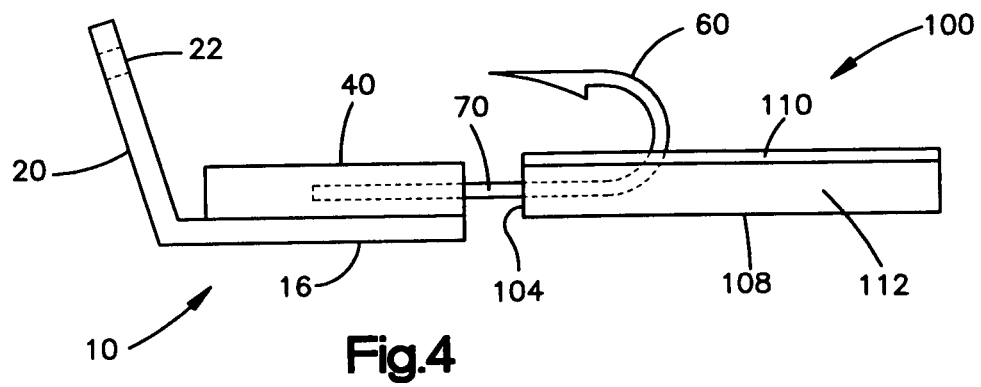
FIG. 4 is an assembled view of fishing lure hook assembly and fishing lure according to an aspect of the present invention.

As best seen in FIG. 4 the fishing lure hook assembly base fish hook barb 66 of the fishing lure hook assembly base fish hook 60 is inserted a short distance from the fishing lure body first end 104. The fishing lure hook assembly base fish hook barb 66 is passed through the fishing lure body lower side 108 and continues through the fishing lure body upper side 110.

As the seen in FIG. 5, is the fishing lure line attachment mechanism 150. The fishing lure line attachment mechanism 150 is typically made of ferrous iron. The fishing lure line attachment mechanism 150 is comprised of the fishing lure line attachment linear region 152. The fishing lure line attachment linear region 152 has a fishing lure line attachment first curved region 154. At one end of the fishing lure line attachment linear region 152 is a fishing lure line attachment second curved region 156. The fishing lure line attachment first curved region 154 is approximately three times the size of the eyelet formed by the fishing lure line attachment second curved region 156.

At the opposite end of the fishing lure line attachment linear region 152 is a fishing lure line attachment eyelet 160. The fishing lure line attachment eyelet 160 is at least partially defined by a fishing lure line attachment eyelet opening 166.

Figure 7A:
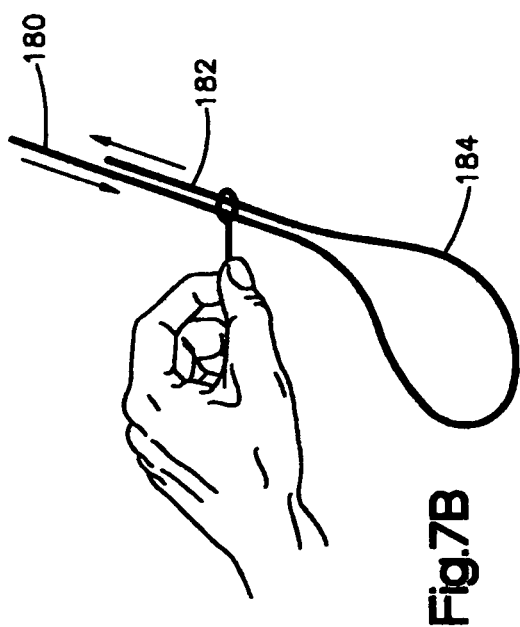
Figure 7B:
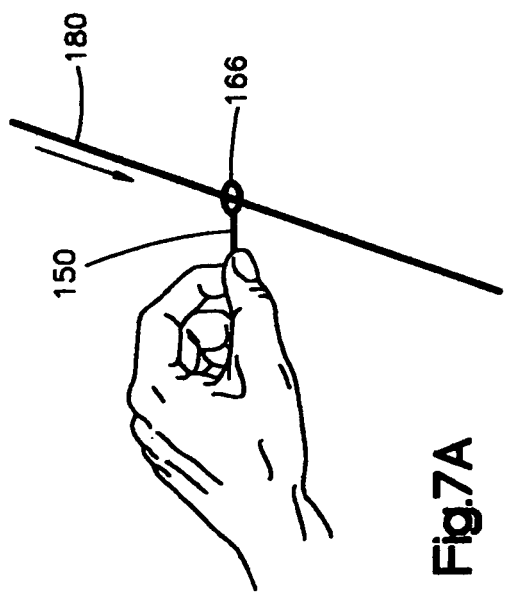

As seen in FIG. 7A-GA is manner of tying a knot suitable for the fishing lure hook assembly 10. Per FIG. 7A fishing line 180 is passed through the fishing lure line attachment eyelet opening 166 of the fishing lure line attachment mechanism 150. The fishing line 180 is then passed through the fishing lure line attachment eyelet opening 166 of the fishing lure line attachment mechanism 150 in opposite direction per FIG. 7B. Accordingly, in FIG. 7B a loop fishing line first loop 184 is formed. One end of the fishing line 180 is now designated as the fishing line terminal end 182.

Figure 7D:
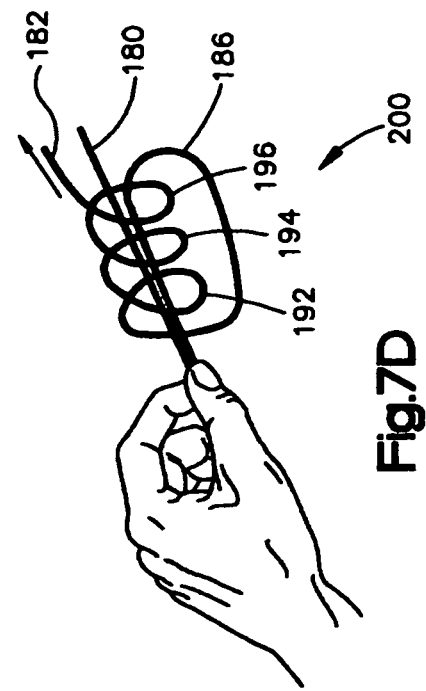
Figure 7C:
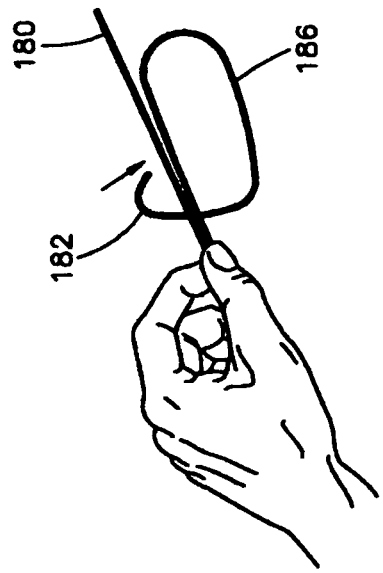

As best seen in FIG. 7C, a fishing line second loop 186 is formed. The fishing line first loop 184 may be visualized as being in hand shown in FIG. 7C. The fishing line terminal end 182 is drawn as shown in back toward the fishing line first loop 184 and loop over the fishing line 180.

The fishing line terminal end 182 is then helically wrapped around the fishing line terminal end 182 and through the fishing line second loop 186. Thus, as seen in FIG. 7D a series of loops fishing line third loop 192, fishing line fourth loop 194, and fishing line fifth loop 196 are formed and at least partially contained in fishing line second loop 186.

As seen in FIG. 7E the fishing line 180 is pulled partially taut thereby forming the fishing line knot 200. As further seen in FIG. 7F the fishing lure line attachment eyelet opening 166 of the fishing lure line attachment mechanism 150 has the fishing line first loop 184 inserted therein. The remaining portion of the fishing line first loop 184 is then a looped over the fishing lure hook assembly 10.

The fishing line first loop 184 is then to drawn taut by the pulling the fishing line 180 around narrowed region of fishing lure line attachment mechanism 150 and simultaneously reducing the size of the fishing line first loop 184. Continued tightening of the fishing line 180 forms a fishing line knot 200 thereby pulling fishing lure line attachment linear region 152 and fishing lure line attachment second curved region 156 at least partially together.

The completed assembly of the fishing lure hook assembly 10, the fishing lure 100, and the fishing line 180 are utilized with a conventional fishing rod. The particular fishing lure 100 is useful in fishing for walleye, perch, crappie, bass, or blue gill. Of particular interest is that catfish may be caught with this lure even though catfish are an aromatic predator. In particular, it is desirous that the fishing line 180 be a 2 to 12 lb. test line.

From the above description of the invention, those skilled in the art will perceive improvements, changes and modifications. Such improvements, changes and modifications within the skill of the art are intended to be covered by the appended claims.

What is claimed is:

1. A fishing lure hook assembly comprising:
   a fishing lure hook assembly base;
   said fishing lure hook assembly base comprising a first region and a second region wherein said first region and said second region define an obtuse angle therebetween;
   a fishing lure hook assembly base upper triangular region connected to said fishing lure hook assembly base;
   a fishing lure hook assembly base triangular region interior channel located within fishing lure hook assembly base upper triangular region;
   a fishing lure hook assembly base fish hook;
   said fishing lure hook assembly base fish hook having a fishing lure hook assembly base fish hook straight region;
   said fishing lure hook assembly base fish hook straight region extending into said fishing lure hook assembly base triangular region interior channel and fixed in place said fishing lure hook assembly base triangular region interior channel.

2. The fishing lure hook assembly according to claim 1, wherein said fishing lure hook assembly base first region comprises a fishing lure hook assembly base triangular region that generally corresponds to the cross-sectional area of the fishing lure hook assembly base upper triangular region.

3. The fishing lure hook assembly according to claim 1, wherein said fishing lure hook assembly base triangular region interior channel is centrally located in said fishing lure hook assembly base upper triangular region.

4. The fishing lure hook assembly according to claim 1, wherein said fishing lure hook assembly base second region comprises a fishing lure hook assembly base rectangular region and said fishing lure hook assembly base rectangular region has a fishing lure hook assembly base rectangular region channel.

5. The fishing lure hook assembly according to claim 1, wherein a fishing lure hook assembly base transition region is formed between said fishing lure hook assembly base first region and said fishing lure hook assembly base second region.

6. The fishing lure hook assembly according to claim 1, wherein said fishing lure hook assembly base upper triangular region is bismuth.

7. The fishing lure hook assembly according to claim 2, wherein said fishing lure hook assembly base triangular region and said fishing lure hook assembly base upper triangular region are welded together.

* * * * *